(12) United States Patent
Piippo

(10) Patent No.: US 9,280,273 B2
(45) Date of Patent: Mar. 8, 2016

(54) METHOD, APPARATUS, AND COMPUTER PROGRAM FOR DISPLAYING CONTENT ITEMS IN DISPLAY REGIONS

(75) Inventor: Petri Matti Olavi Piippo, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 167 days.

(21) Appl. No.: 13/174,065

(22) Filed: Jun. 30, 2011

(65) Prior Publication Data

US 2013/0007663 A1   Jan. 3, 2013

(51) Int. Cl.
  *G06F 3/048*   (2013.01)
  *G06F 3/0485*   (2013.01)
  *G06F 3/0482*   (2013.01)

(52) U.S. Cl.
  CPC .......... *G06F 3/04855* (2013.01); *G06F 3/0482* (2013.01); *G06F 2203/04803* (2013.01); *G06F 2203/04806* (2013.01)

(58) Field of Classification Search
  USPC .......................................................... 715/821
  See application file for complete search history.

(56) References Cited

U.S. PATENT DOCUMENTS

| | | | | |
|---|---|---|---|---|
| 5,805,235 | A * | 9/1998 | Bedard | 725/38 |
| 2002/0069218 | A1* | 6/2002 | Sull et al. | 707/501.1 |
| 2002/0075408 | A1* | 6/2002 | Curreri | 348/569 |
| 2002/0089550 | A1* | 7/2002 | Orbanes et al. | 345/853 |
| 2002/0107973 | A1* | 8/2002 | Lennon et al. | 709/231 |
| 2002/0109680 | A1* | 8/2002 | Orbanes et al. | 345/418 |
| 2002/0152267 | A1* | 10/2002 | Lennon | 709/203 |
| 2002/0167534 | A1* | 11/2002 | Burke | 345/629 |
| 2006/0036568 | A1* | 2/2006 | Moore et al. | 707/1 |
| 2006/0080342 | A1 | 4/2006 | Takaki | |
| 2007/0150368 | A1* | 6/2007 | Arora et al. | 705/26 |
| 2008/0222558 | A1 | 9/2008 | Cho et al. | |
| 2008/0288476 | A1* | 11/2008 | Kim et al. | 707/4 |
| 2009/0119589 | A1 | 5/2009 | Rowell et al. | |
| 2009/0172543 | A1 | 7/2009 | Cronin et al. | |
| 2009/0254643 | A1* | 10/2009 | Terheggen et al. | 709/223 |
| 2010/0082585 | A1 | 4/2010 | Barsook et al. | |
| 2010/0100852 | A1* | 4/2010 | Buchanan | 715/854 |
| 2010/0281372 | A1 | 11/2010 | Lyons et al. | |
| 2011/0047512 | A1* | 2/2011 | Onogi | G06F 3/0482 715/836 |
| 2011/0128241 | A1* | 6/2011 | Kang et al. | 345/173 |
| 2012/0030614 | A1 | 2/2012 | Tuli | |
| 2012/0081750 | A1* | 4/2012 | Shibamiya et al. | 358/1.15 |

(Continued)

FOREIGN PATENT DOCUMENTS

EP   2296370 A1   3/2011
WO  WO 2009/012315 A1   1/2009

OTHER PUBLICATIONS

Cowart et al., Platinum Edition—Using Microsoft Windows XP, pp. 432-442, Jul. 2003.*

(Continued)

*Primary Examiner* — Jennifer To
*Assistant Examiner* — Joseph R Burwell
(74) *Attorney, Agent, or Firm* — Alston & Bird LLP

(57) ABSTRACT

A method comprises causing at least one of a set of content items to be displayed in a first region of a display; causing at least one of the set of content items to be displayed in a second region of the display; in response to an input in relation to the second region, causing at least one other of the set of content items to be displayed in the second region; and, in response to determining that a selected one of the set of content items is not being displayed in the second region, causing an element associated with the selected content item to be displayed.

20 Claims, 13 Drawing Sheets

(56) References Cited

U.S. PATENT DOCUMENTS

2012/0210230 A1* 8/2012 Matsuda et al. ............. 715/723
2012/0291056 A1* 11/2012 Donoghue ...................... 725/5
2012/0321280 A1* 12/2012 Lin ............................. 386/240
2013/0191711 A1* 7/2013 Tashman et al. ............. 715/205

OTHER PUBLICATIONS

Windows Media Player, Microsoft, 2004.*

Welcome to Flickr—Photo Sharing—Windows Internet Explorer [online] [retrieved May 29, 2012]. Retrieved from the Internet: URL: <http://www.flickr.com>. 4 pages.
International Preliminary Report on Patentability for PCT/IB2012/053260 dated Jan. 7, 2014.
International Search Report and Written Opinion for PCT/IB2012/053260 dated Nov. 15, 7012.
Supplementary European Search Report for Ep Application No. 20120805007.7 dated Mar. 2, 2015.

* cited by examiner

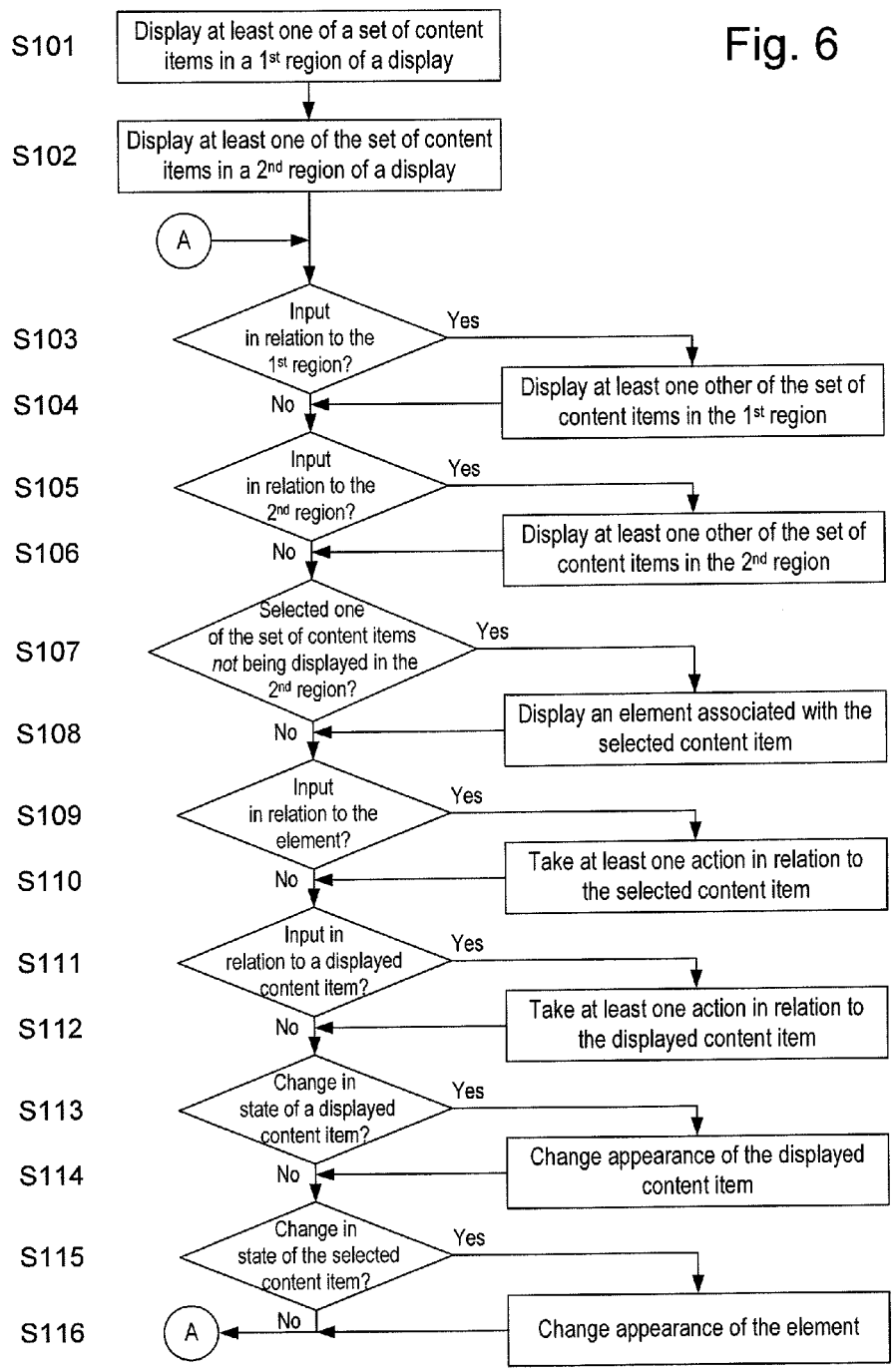

METHOD, APPARATUS, AND COMPUTER PROGRAM FOR DISPLAYING CONTENT ITEMS IN DISPLAY REGIONS

FIELD

The invention relates to a method, apparatus and computer program for displaying content, particularly content items.

BACKGROUND

User interfaces that allow content to be browsed in new ways have proved to be popular. Such user interfaces can provide for greater ease of use.

SUMMARY

According to a first aspect, this specification provides a method comprising causing at least one of a set of content items to be displayed in a first region of a display; causing at least one of the set of content items to be displayed in a second region of the display; in response to an input in relation to the second region, causing at least one other of the set of content items to be displayed in the second region; and, in response to determining that a selected one of the set of content items is not being displayed in the second region, causing an element associated with the selected content item to be displayed.

The position of the element may indicate a direction of an input in relation to the second region that is needed to cause the selected content item to be displayed in the second region.

The method may comprise: in response to an input in relation to the element, taking at least one action in relation to the selected content item.

The method may comprise: in response to an input in relation to a content item that is being displayed in the first and/or the second region, taking at least one action in relation to the displayed content item.

The at least one action in relation to the selected or the displayed content item may respectively comprise causing the selected or the displayed content item to be displayed in the first and/or the second region if it is not already displayed therein.

The at least one action in relation to the selected or the displayed content item may respectively comprise causing the selected or the displayed content item to be displayed substantially centrally in the first region and/or the second region.

The at least one action in relation to the selected or the displayed content item may respectively comprise causing a state of the selected or the displayed content item to be changed. The change in the state may comprise a change from a playback state to a stopped state or vice versa.

The method may comprise: displaying playback of the selected or the displayed content item in the first region.

The at least one action in relation to the displayed content item may comprise selecting the displayed content item. The method may comprise: in response to the selecting of the displayed content item, causing the appearance of the selected displayed content item to be changed.

The method may comprise: in response to a change in a state of the selected or the displayed content item respectively, causing the appearance of the element or the displayed content item to be changed.

The changed appearance may provide an indication of one of at least one action that can be taken in relation to the selected content item.

The element may be similar in appearance to the selected content item when it was displayed in the second region.

The method may comprise: in response to an input in relation to the first region, causing at least one other of the set of content items to be displayed in the first region.

The method may comprise: causing the at least one other content item to be displayed in the first and the second regions independently of each other.

The method may comprise: causing a view of a space to be displayed in the first region; causing each of the content items displayed in the first region to be displayed at a predetermined location in the space; and in response to the input in relation to the first region, causing the view of the space to be changed, thereby causing the at least one other content item to be displayed in the first region.

The method may comprise: causing the content items displayed in the second region to be displayed in a one-dimensional arrangement in an order that is defined for the set of content items.

The input in relation to the second region may comprise a scrolling input.

According to a second aspect, this specification provides a computer program comprising instructions which, when executed by a processor, cause the processor to perform the method.

According to a third aspect, this specification provides a non-transitory computer-readable storage medium having stored thereon computer-readable code, which, when executed by computer apparatus, causes the computer apparatus to: display at least one of a set of content items in a first region of a display; display at least one of the set of content items in a second region of the display; in response to an input in relation to the second region, display at least one other of the set of content items in the second region; and in response to determining that a selected one of the set of content items is not being displayed in the second region, display an element associated with the selected content item.

According to a fourth aspect, this specification provides apparatus comprising: at least one processor; and at least one memory including computer program code, wherein the at least one memory and the computer program code are configured, with the at least one processor, to cause the apparatus to: display at least one of a set of content items in a first region of a display; display at least one of the set of content items in a second region of the display; in response to an input in relation to the second region, display at least one other of the set of content items in the second region; and in response to determining that a selected one of the set of content items is not being displayed in the second region, display an element associated with the selected content item.

The position of the element may indicate a direction of an input in relation to the second region that is needed to cause the selected content item to be displayed in the second region.

The at least one memory and the computer program code may be configured, with the at least one processor, to cause the apparatus to: in response to an input in relation to the element, take at least one action in relation to the selected content item.

The at least one memory and the computer program code may be configured, with the at least one processor, to cause the apparatus to: in response to an input in relation to a content item that is being displayed in the first and/or the second region, take at least one action in relation to the displayed content item.

The at least one action in relation to the selected or the displayed content item may respectively comprise causing the selected or the displayed content item to be displayed in the first and/or the second region if it is not already displayed therein.

The at least one action in relation to the selected or the displayed content item may respectively comprise causing a state of the selected or the displayed content item to be changed. The change in the state may comprise a change from a playback state to a stopped state or vice versa.

The at least one action in relation to the displayed content item may comprise selecting the displayed content item. The at least one memory and the computer program code may be configured, with the at least one processor, to cause the apparatus to: in response to the selecting of the displayed content item, change the appearance of the selected displayed content item.

The at least one memory and the computer program code may be configured, with the at least one processor, to cause the apparatus to: in response to a change in a state of the selected or the displayed content item respectively, change the appearance of the element or the displayed content item.

The changed appearance may provide an indication of one of at least one action that can be taken in relation to the selected content item.

The element may be similar in appearance to the selected content item when it was displayed in the second region.

The at least one memory and the computer program code may be configured, with the at least one processor, to cause the apparatus to: in response to an input in relation to the first region, cause at least one other of the set of content items to be displayed in the first region. The at least one memory and the computer program code may be configured, with the at least one processor, to cause the apparatus to: display a view of a space in the first region; display each of the content items displayed in the first region at a predetermined location in the space; and in response to the input in relation to the first region, change the view of the space, thereby causing the at least one other content item to be displayed in the first region.

The at least one memory and the computer program code may be configured, with the at least one processor, to cause the apparatus to: display the content items displayed in the second region in a one-dimensional arrangement in an order that is defined for the set of content items.

According to a fifth aspect, this specification provides an apparatus comprising: means for displaying at least one of a set of content items in a first region of a display; means for displaying at least one of the set of content items in a second region of the display; means, responsive to an input in relation to the second region, for displaying at least one other of the set of content items in the second region; means, responsive to determining that a selected one of the set of content items is not being displayed in the second region, for displaying an element associated with the selected content item.

BRIEF DESCRIPTION OF THE DRAWINGS

Exemplary embodiments of the invention are described below with reference to the accompanying drawings, in which:

FIG. 6 is a flow diagram of an example method of displaying content items.

DETAILED DESCRIPTION OF THE EMBODIMENTS

Figure 1:
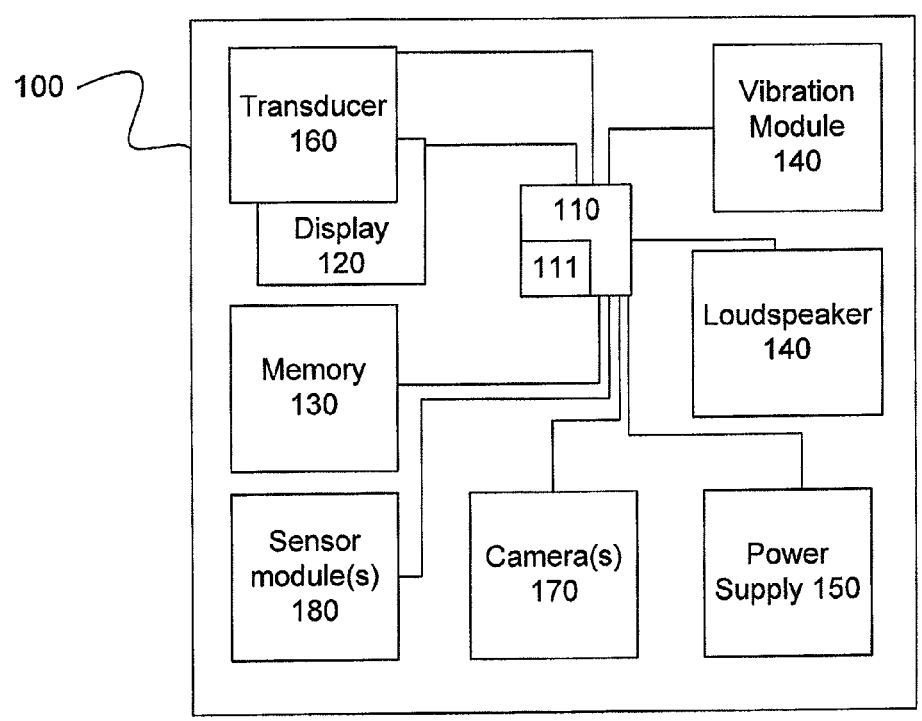
FIG. 1 is schematic diagram of an apparatus for displaying content items.

In the description and drawings, like reference numerals refer to like elements throughout.

Figure 2:
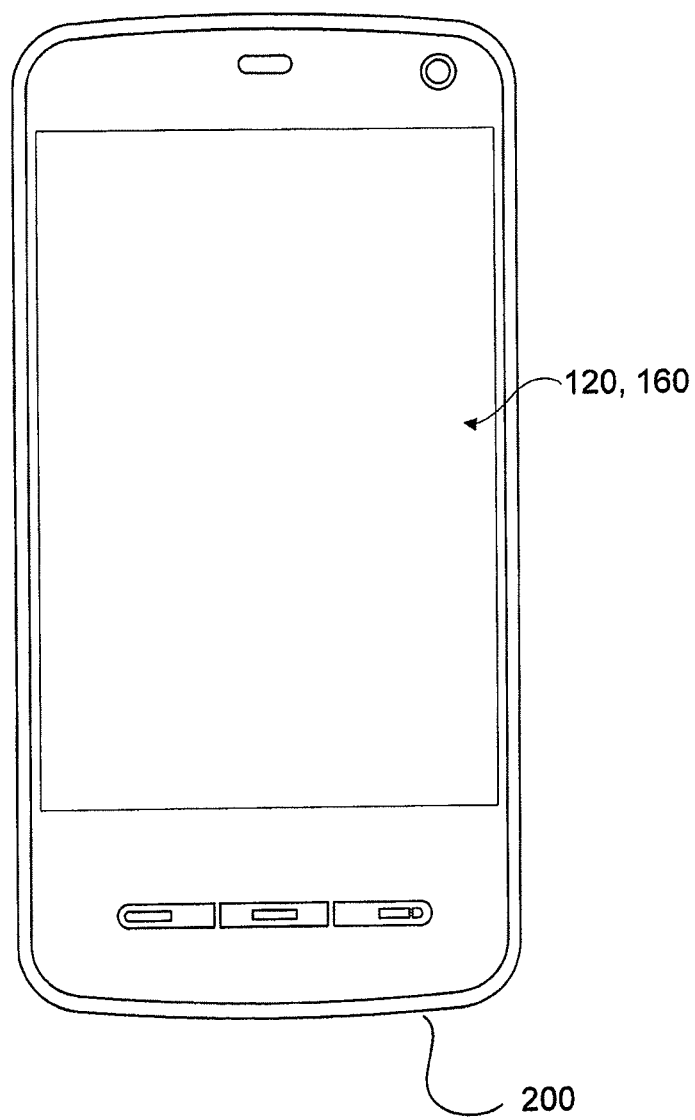
FIG. 2 is an illustration of an electronic device comprising a mobile telephone.

FIG. 1 is a simplified schematic of an electronic apparatus 100. As will be understood from the following description, the electronic apparatus 100 can be comprised in a single electronic device 200 or can be distributed. An example electronic device 200 comprising a mobile (e.g. cellular) telephone terminal 200 is shown in FIG. 2. However, the electronic device 200 could alternatively be another type of device such as a PDA (personal digital assistant), a positioning device (e.g. a GPS (global positioning system) module), a music player, a gaming console or a personal computer. Furthermore, although the electronic device shown in FIG. 2 is portable, example embodiments of the invention are also applicable to non-portable devices.

The electronic apparatus 100 comprises a controller 110, which is configured to control the output of a display panel 120. The controller 110 includes one or more processors 111 operating under the control of computer readable code optionally stored on a non-transitory memory medium 130 such as ROM or RAM. The controller 110 can also comprise one or more application-specific integrated circuits (ASICs) (not shown).

The controller 110 can be configured to control the output of one or more non-visual output transducers 140 for providing non-visual feedback to a user. For example the non-visual output transducers 140 can comprise a loudspeaker and/or a vibration module to provide alerts or other non-visual information to a user of the apparatus 100.

A power supply 150 is configured to supply power to the components of the apparatus 100. The power supply 150 can comprise a suitable re-chargeable battery or fuel cell. Additionally or alternatively, the power supply 150 can be configured to receive power from a mains electricity supply.

A touch-sensitive transducer 160 can be configured to supply signals indicative of tactile inputs incident on the touch-sensitive transducer 160 to the controller 110. For example, the touch-sensitive transducer 160 can be a touch-sensitive panel 160 overlaid on the display panel 120 to form a touch-sensitive screen 120, 160. The touch sensitive transducer 160 is configured to generate and supply the signals to the controller 110 in response to detecting a tactile input at the screen 120, 160.

One or more cameras 170 can be provided. Each camera 170 can include any image sensing technology such as a charge-coupled device (CCD) or an active pixel sensor such as a complementary metal oxide semiconductor (CMOS) device.

One or more sensor modules 180 can be provided. A sensor module 180 can be configured to sense external actions and supply signals indicative thereof to the controller 110. For example, a sensor module 180 could comprise a proximity sensor.

The apparatus 100 can also comprise, in addition to those components described above, other elements such as, but not limited to, depressible keys, a microphone, an antenna and transceiver circuitry.

The display panel 120 is configured to display a user interface 200 under the control of the controller 110. An example user interface 200 is illustrated in FIG. 3. The user interface 200 is implemented as a computer program, or software, that is configured to operate along with user interface 200 hardware, including the touch-sensitive screen 120, 160 and optionally a keypad/keyboard (not shown) comprised in the user interface 200 or elsewhere in the apparatus 100. The device 100 could also be configured to obtain inputs using a hovering technique. In particular, instead of, e.g., a direct physical touch of the touch-sensitive screen 120, 160, an object such as finger may be hovered in the vicinity of, e.g. above, the device 100. The object and its relation to a manipulated user interface element may be detected e.g. by using a camera 170 and/or a sensor module 180 configured to detect the object.

The user interface 200 software may be separate from an operating system stored in the memory 130, in which case it interacts closely with the operating system as well as applications stored in the memory 130. Alternatively, the user interface 200 software could be integrated with the operating system.

Referring to FIGS. 3, 4 and 5, the user interface 200 can comprise a first display region 210 and a second display region 220, each of which is for displaying content and other information to a user. The content displayed in the first and second display regions 210, 220 can comprise items 300 of content such as, for example, videos or other types of content that can be played back such as audio clips, or images or documents, etc. The content items 300 can form a set of content items 300.

The content items 300 can be displayed in the first and second display regions 210, 220 in a representative form. For example, a content item 300 which is a video can be represented by a frame from the video, together with an indication that the content item 300 is a video, e.g. text indicating the duration of the video. A content item 300 which is an image can be represented by a smaller version of the image.

The content items 300 and any associated data can be stored in the memory 130 (FIG. 1) and/or can be received via the transceiver circuitry.

As will be described in more detail below, the user interface 200 can provide a way for a user to browse, e.g. look through, the content items 300. A user may consume the content and take various related actions. For example, a user may play a video, view an image, send a content item 300 to a recipient via the transceiver circuitry, or delete a content item from the memory 130.

A user may browse the content items 300 using one or both of the first and second display regions 210, 220. The first display region 210 can be for displaying the content items 300 in such a way as to convey additional, contextual information related to the content items 300 and/or to provide an improved user experience when browsing the content items 300. The second display region 220 can be for displaying the content items 300 in a more summary way than the first display region 210.

Each content item 300 can be associated with at least one defined position in a space. The space can be one, two or three dimensional. For example, each content item 300 can be associated with a position in a two-dimensional area. Such a two-dimensional area can correspond to a geographical area. Alternatively, the space could be abstract.

The first display region 210 can be for displaying a map 310 of the space. The whole or a part of the map 310 can be viewable in the first display region 210. A three-dimensional perspective view of the map 310 can be provided. In particular, the view can be an oblique view of a generally horizontal map 310 surface.

Alternatively, a two-dimensional plan view of the map 310 can be provided. The map 310 can include graphical elements. These graphical elements can be representations of geographical features, e.g. roads and buildings, satellite imagery, or a combination of representations and satellite imagery.

The first display region 210 can be for displaying content items 300 at or in the vicinity of the positions on the map 310 with which they are associated. For example, where a three-dimensional perspective view is provided, each content item 300 can be displayed above its map position. A shadow or other type of marker (not shown) can be displayed below the content item 300 so as to more precisely indicate the map position.

The content items 300 can be displayed in accordance with the map view. For example, where a three-dimensional perspective view is provided, more distant content items 300 can be smaller than nearer content items 300. Content items 300 can also be replaced with icons if they are sufficiently distant. Each content item 300 can be displayed on a two-dimensional surface above the map 310. The two-dimensional surface can be vertically orientated. The orientation of the two-dimensional surface can be used to convey further information about the content item 300. For example, where the content item 300 corresponds to a photograph of an object on the map 310, the content item 300 can be orientated so as to match the camera angle used to obtain the photograph.

Where a two-dimensional plan view is provided, content items 300 can be displayed at their map positions and can be sized, or replaced by icons, in dependence upon the scale of the map, e.g. the zoom level.

Content items 300 can be displayed in the first display region 210 whenever the map positions with which they are associated are within the area of the map 310 which is in view. Content items 300 can be hidden if they are associated with too distant a position in the map view. When a user changes the map view, the content items 300 which are displayed in the first display region 210 can be changed accordingly.

A user may change the map view in various different ways. For example, a user can pan, e.g. rotate, the view, can zoom in or out, or can shift the viewpoint. These operations can be performed by touching the touch-sensitive screen 120, 160 (FIG. 1) in specified ways. For example, a user may touch the first display region 210 at any single point and then move the point of contact in a certain direction in order to pan in that direction. Buttons 320 can be provided in the first display region 210 for performing at least some of the operations, e.g. for zooming in and out. Alternatively or additionally, the operations could be performed using the keypad/keyboard or by using the hovering technique described above.

As will be described in more detail below, a user may also cause the map view to be changed by selecting a content item 300.

The map view can also be changed in other ways, for example by an application.

The first display region 210 can be for displaying further elements. For example, there can be an indicator 330 for showing the orientation of the map 310, e.g. in relation to the direction of north. There can also be one or more buttons provided on the touch-sensitive screen 120, 160 (FIG. 1) for performing operations. For example, amongst others, there can be a button 340 for accessing a menu and there can be a button 350 for going back to a previously displayed screen.

The second display region 220 can be for displaying one or more content items 300 from the same set of content items 300 that is displayed in the first display region 210. As will be described in more detail below, the first and second display regions 210, 220 can be used independently. However, some operations in relation to one of the first and second display regions 210, 220, e.g. selecting a content item 300, can affect which content items 300 are displayed in the other of the first and second display regions 210, 220.

The second display region 220 can be for displaying the content items 300 differently from the first display region 210 and for allowing the content items 300 to be browsed in a different way. For example, smaller versions of the content items 300 can be displayed and the content items 300 can be arranged in a simpler and/or more compact arrangement. This can help to allow the content items 300 to be browsed more quickly by a user.

The second display region 220 can be for displaying the content items 300 arranged consecutively in a one-dimensional arrangement. The one-dimensional arrangement can be substantially linear or can be curved, and can extend in any one or more directions. However, for convenience, the one-dimensional arrangement will be referred to hereinafter as a row 360 of content items 300. The row 360 can hold a plurality of content items 300, e.g. twelve content items 300, corresponding to the whole or, more usually, to a subset of the set of content items 300. The size of the row 360 can depend upon the size of the display panel 120 and/or upon settings that can be changed by a user. The order in which content items 300 are arranged in the row 360 is defined for the set of content items 300. The order can be related to the map positions used in the first display region 210. However, this need not be the case and the order can depend upon one or more other characteristics of the content items 300.

A user may change which ones of the set of content items 300 are displayed in the row 360 by scrolling through the content items 300. This can be done using the touch-sensitive screen 120, 160 (FIG. 1). For example, a user may touch the touch-sensitive screen 120, 160 (FIG. 1) at any point in the second display region 220 and then move the point of contact towards one end of the row 360. In response to this, content items 300 can be removed from one end of the row 360 and other content items 300 can be added to the other end of the row 360. Alternatively or additionally, the scrolling could be carried out by operating the keypad/keyboard or by using the hovering technique.

A user may also change the arrangement of content items 300 in the first and/or second display region 210, 220 by selecting one of the content item 300 displayed therein. This can also change which ones of the set of content items 300 are displayed.

A user may select a displayed content item 300 by touching the touch-sensitive screen 120, 160 (FIG. 1) in the vicinity of a content item 300. Alternatively or additionally, the selection could be carried out by operating the keypad/keyboard, e.g. to move a cursor or pointer (not shown) displayed on the display panel 120, or by using the hovering technique.

A content item 300 can also be selected in other ways, for example by an application.

In response to a selection of a content item 300 in the first display region 210, the map view can be automatically changed so that the selected content item 300' is displayed more prominently in the first display region 210. For example, the selected content item 300' can be positioned in the centre and/or the foreground of the map view and/or orientated so that it is viewed face on. The change in the map view can be animated, e.g. moving smoothly from the old view to the new view.

In response to a selection of a content item 300 in the second display region 220, the content items 300 can be automatically scrolled so that the selected content item 300' is displayed more prominently, e.g. substantially in the centre of the row 360.

Furthermore, in response to a selection of a content item 300 in one of the display regions 210, 220, the arrangement of content items 300 in the other display region 210, 220 can be changed. In particular, a selection in one display region 210, 220 can cause the selected content item 300' to be displayed in the other display region 210, if it is not already displayed therein, and/or to be displayed prominently, e.g. centrally.

Information about which one of the content items 300 was last selected can be stored by the apparatus, e.g. in the memory 130 (FIG. 1). Hence each content item 300 can be in either a selected state or an unselected state. When a user selects an unselected content item 300, it can be changed to be in a selected state and the old selected content item 300', if any, can be changed to be in an unselected state.

Selecting a content item 300' which is already selected, e.g., re-selecting a content item 300', need not change its state. However, re-selecting a content item 300' can cause the arrangement of content items 300 in the first and/or second display regions 210, 220 to be changed, as described above.

The selected content item 300' can be highlighted or otherwise differentiated from the unselected content items 300 in the first and/or second display regions 210, 220. For example, the area around the selected content item 300' can be changed in appearance, e.g. coloured differently.

Various ways of browsing the content items 300 are thus provided. A user may choose a particular one of the display regions 210, 220 for browsing the content items 300. For example, a user may wish to use the contextual information, e.g. the location information, provided by the first display region 210 in order to find a desired content item 300. Alternatively, a user may wish to use the second display region 220 to quickly find a desired content item 300 which is easily identifiable.

Figure 3A:
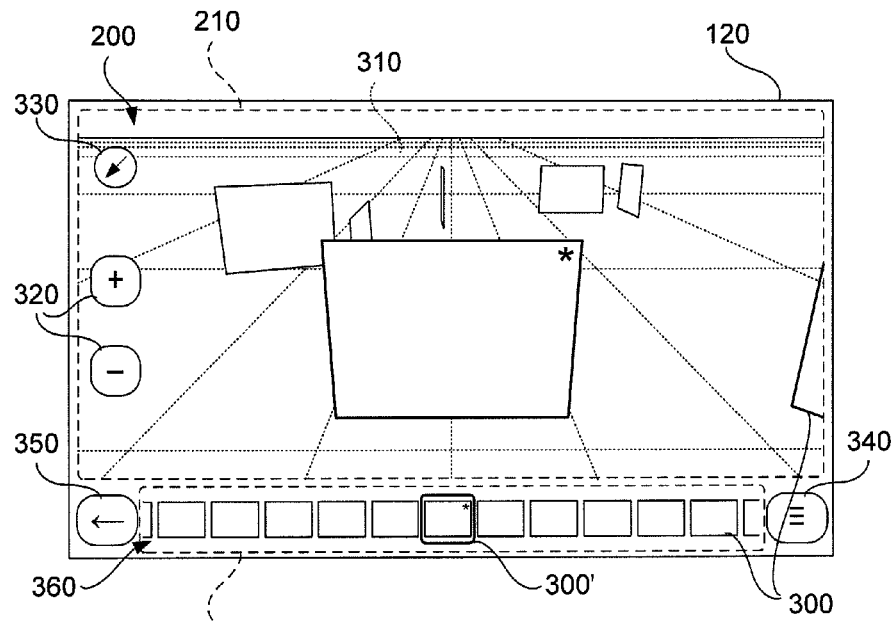
FIG. 3A is an illustration of a first screen shot of a user interface, in which a selected content item is centrally displayed in each of first and second regions of a display.
Figure 3B:
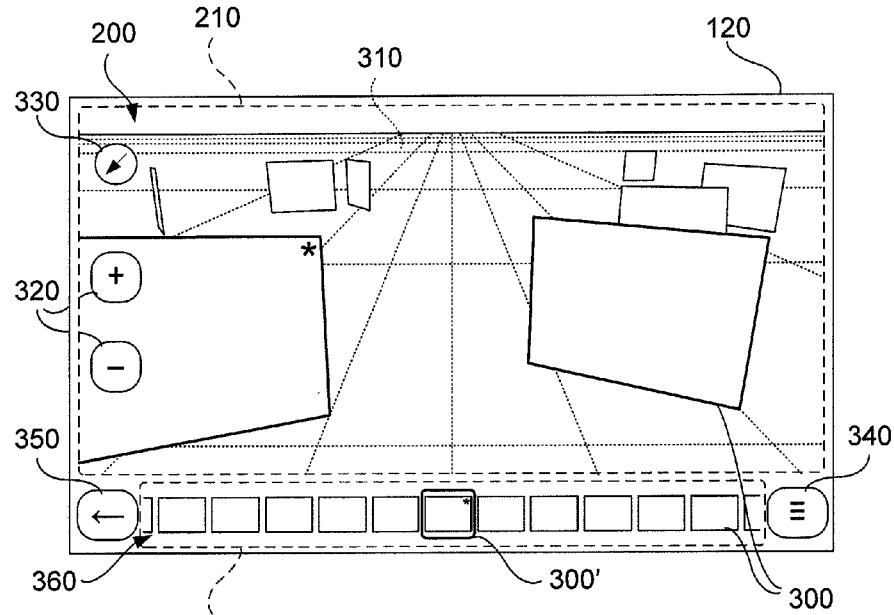
FIG. 3B is an illustration of a second screen shot of the user interface shown in FIG. 3A, in which the first region has been used for browsing content items.

Regardless of which display region 210, 220 is used for browsing the content items 300, if a desired content item 300 is found, then it can be selected and so displayed, e.g. centrally, in both display regions 210, 220, as illustrated in FIG. 3A. Further actions can then be taken, e.g. neighbouring content items 300 can be browsed using the first display region 210, as illustrated in FIG. 3B.

Figure 3C:
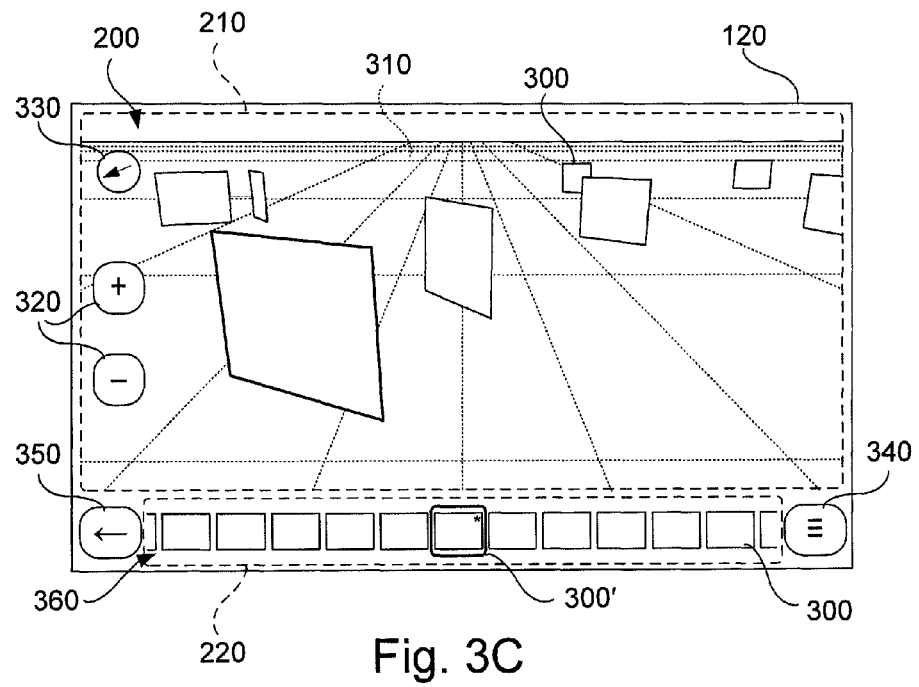
FIG. 3C is an illustration of a third screen shot of the user interface shown in FIG. 3A, in which the first region has been used for browsing content items. The selected content item is not displayed in the first region but is displayed in the second region.

Instead of selecting a new content item 300, a user may wish to go back to displaying the last selected content item 300' in both display regions 210, 220. For example, a user may have changed the map view so that the selected content item 300' is no longer displayed in the first display region 210, as illustrated in FIG. 3C. In this case, provided that the selected content item 300' is still displayed in the second display region 220, a user may re-select the content item 300', thereby causing it to be also displayed in the first display region 210. The user may thus return to a previous screen, e.g., as illustrated in FIG. 3A. This can help to prevent a user from becoming lost when browsing the content items 300.

Figure 3D:
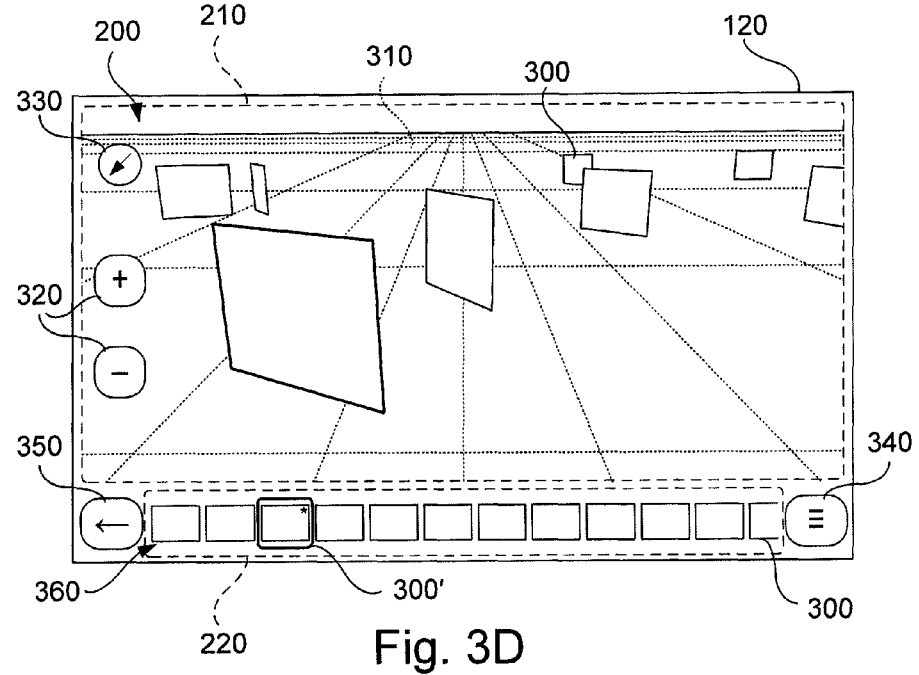
FIG. 3D is an illustration of a fourth screen shot of the user interface shown in FIG. 3A, in which the first and the second regions have been used for browsing content items.
Figure 3E:
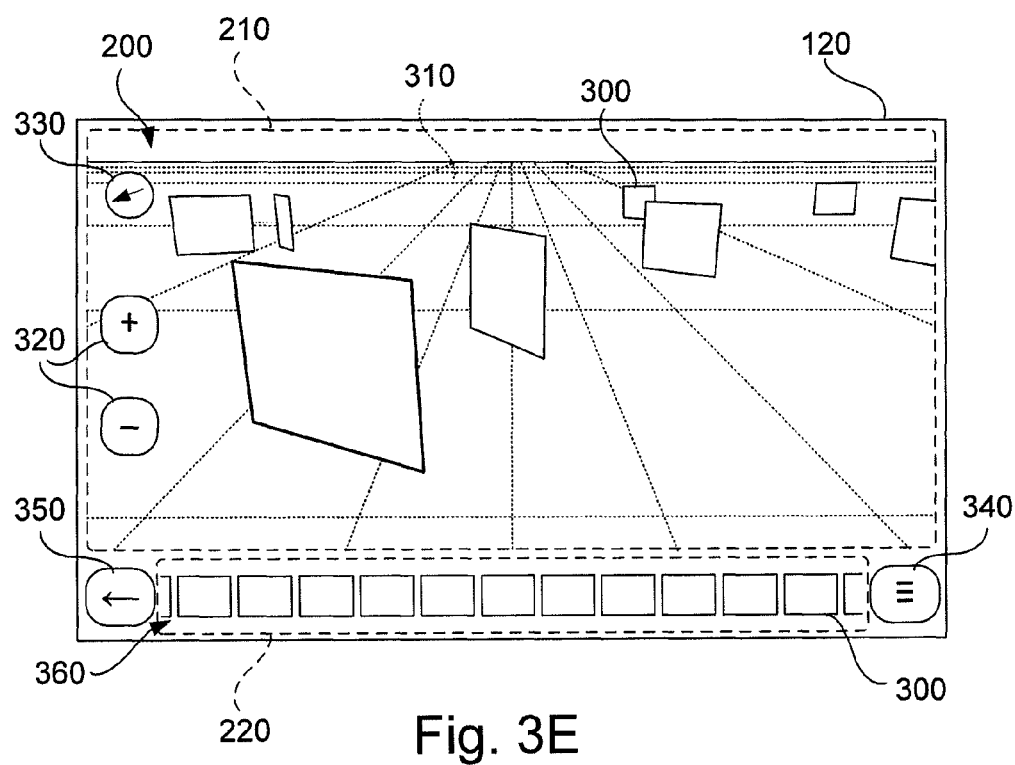
FIG. 3E is an illustration of a fifth screen shot of the user interface shown in FIG. 3A, in which the first and the second regions have been used for browsing content items. The selected content item is not displayed in the first region or the second region. A floating shortcut has not been shown.

However, a user may browse the content items 300 using both display regions 210, 220, as illustrated in FIG. 3D. For example, a user may first browse the content items 300 using the first display region 210 and then change to browsing the content items 300 using the second display region 220. As a result, the selected content item 300' may no longer be displayed in either of the display regions 210, 220, as illustrated in FIG. 3E. In these circumstances, without further information, it can be difficult for a user to go back to viewing the currently selected content item 300'.

Figure 4A:
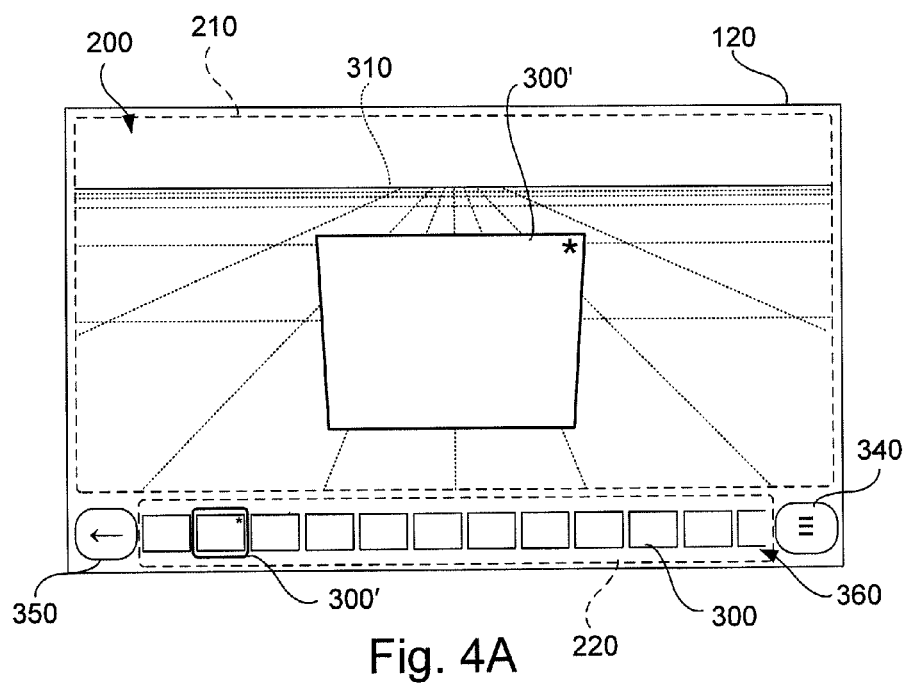
FIG. 4A is an illustration of a first screen shot of a user interface, in which a selected content item corresponding, for example, to an image is displayed in each of first and second regions of a display.
Figure 4B:
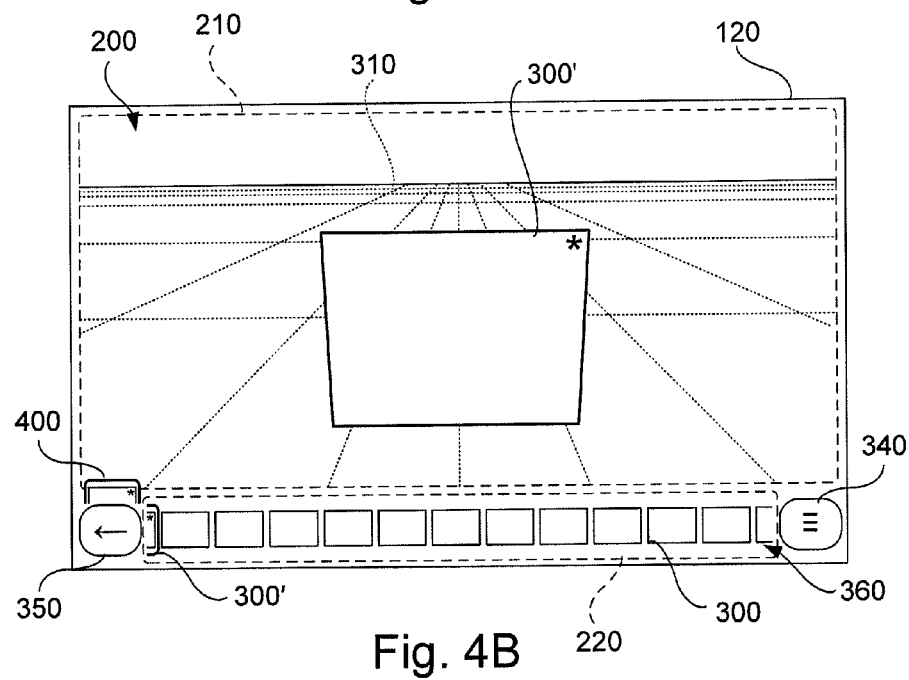
FIG. 4B is an illustration of a second screen shot of the user interface shown in FIG. 4A, in which a floating shortcut is partially displayed in the vicinity of the end of the second region to which the selected content item has been moved.
Figure 4C:
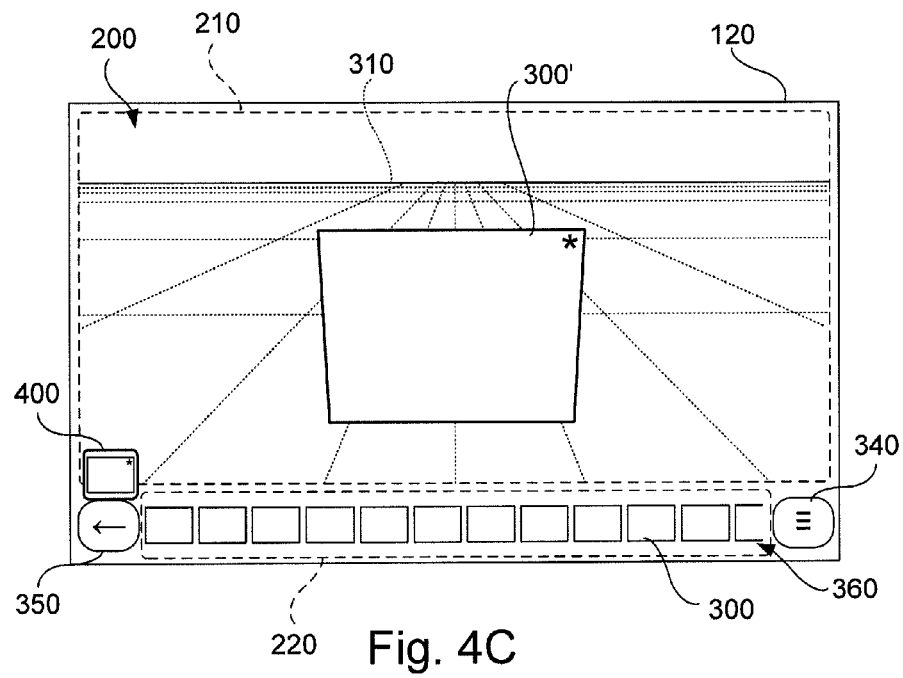
FIG. 4C is an illustration of a third screen shot of the user interface shown in FIG. 4A, in which the floating shortcut is fully displayed in the vicinity of the end of the second region beyond which the selected content item has been moved.

To address this, an element 400 can be displayed whenever the selected content item 300' is not displayed in the second display region 220. The element 400 will be referred to hereinafter as a floating shortcut. For example, as illustrated in FIGS. 4A, 4B and 4C, the floating shortcut 400 can be displayed when a user has scrolled the content items 300 in the second display region 220 such that a selected content item 300' is no longer displayed therein.

The floating shortcut 400 can have a similar appearance to the selected content item 300' when it was displayed in the second display region 220. The floating shortcut 400 can be animated when it comes into or out of view. The opacity level of the floating shortcut 400 can be changed, for example.

The floating shortcut 400 can be positioned so as to reflect the relative positions of the selected content item 300' and the content items 300 currently being displayed in the second display region 220. Hence the floating shortcut 400 can provide an indication of the direction in which the row 360 of content items 300 has been scrolled since a selection of a content item 300, and needs to be scrolled to go back to displaying the selected content item 300'. For example, as illustrated in FIGS. 4B and 4C and 4E and 4F, if the selected content item 300' has been removed from one end of the row 360 of content items 300, then the floating shortcut 400 can be positioned in the vicinity of that end. The floating shortcut 400 has been moved to the left in FIGS. 4B and 4C and to the right in FIGS. 4E and 4F. Thus, the position of the floating shortcut 400 can help a user to go back to the selected content item 300'.

Alternatively, the floating shortcut 400 could be displayed in a position which does not depend upon how the content items 300 have been scrolled.

In any case, the floating shortcut 400 can provide a way for a user to go directly back to displaying the selected content item 300' in the second display region 220. This can be done by a user selecting the floating shortcut 400.

A user may select the floating shortcut 400 by touching the touch-sensitive screen 120, 160 (FIG. 1) in the vicinity of the floating shortcut 400. Alternatively or additionally, a selection could be carried out by operating the keypad/keyboard, e.g. to move a cursor or pointer (not shown) displayed on the display panel 120. Alternatively or additionally, a selection could be carried out using the hovering technique described above.

In response to the selection of the floating shortcut 400, the content items 300 can be automatically scrolled so that the selected content item 300' is displayed prominently in the second display region 220, e.g. substantially in the centre of the row 360.

In response to the selection of the floating shortcut 400, the map view can be automatically changed so that the selected content item 300' is displayed prominently in the first display region 210. For example, the selected content item 300' can be positioned in the centre and/or the foreground of the map view and/or orientated so that it is viewed face on. The change in the map view can be animated.

Figure 4D:
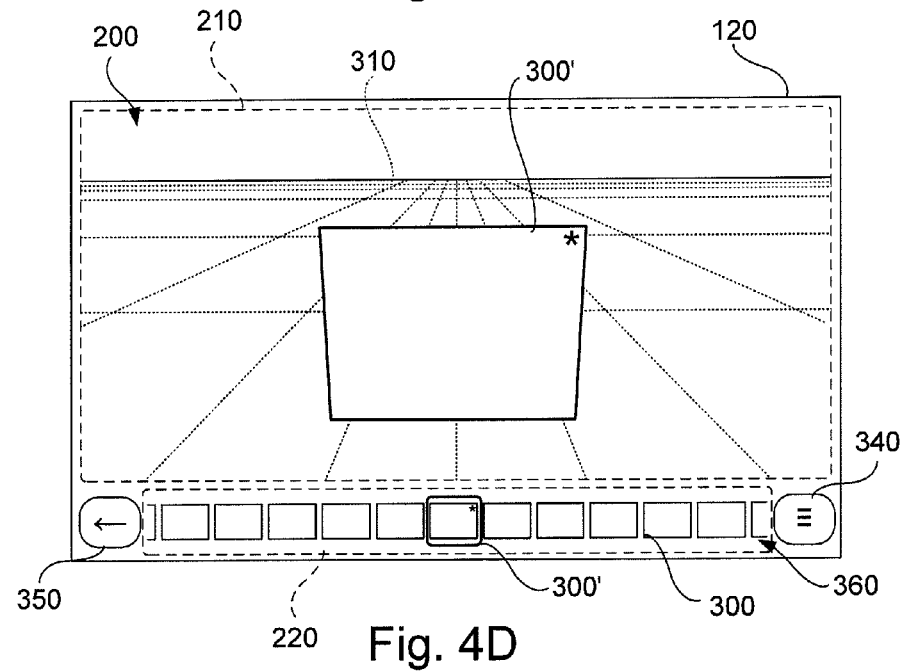
FIG. 4D is an illustration of a fourth screen shot of the user interface shown in FIG. 4A, in which the selected content item is centrally displayed in each of the first and second regions. The screen may have been reached by selecting the floating shortcut shown in FIG. 4C.
Figure 4E:
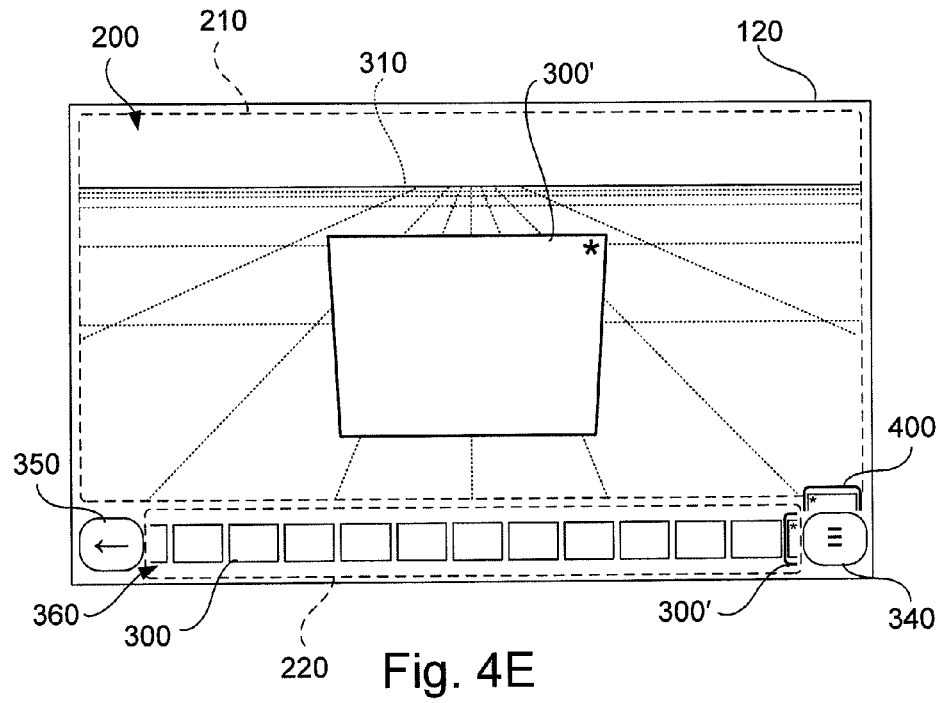
FIG. 4E is an illustration of a fifth screen shot of the user interface shown in FIG. 4A, in which a floating shortcut is partially displayed in the vicinity of the end of the second region to which the selected content item has been moved. The end to which the selected content item has been moved is the other end from the end to which it had been moved in FIG. 4C.
Figure 4F:
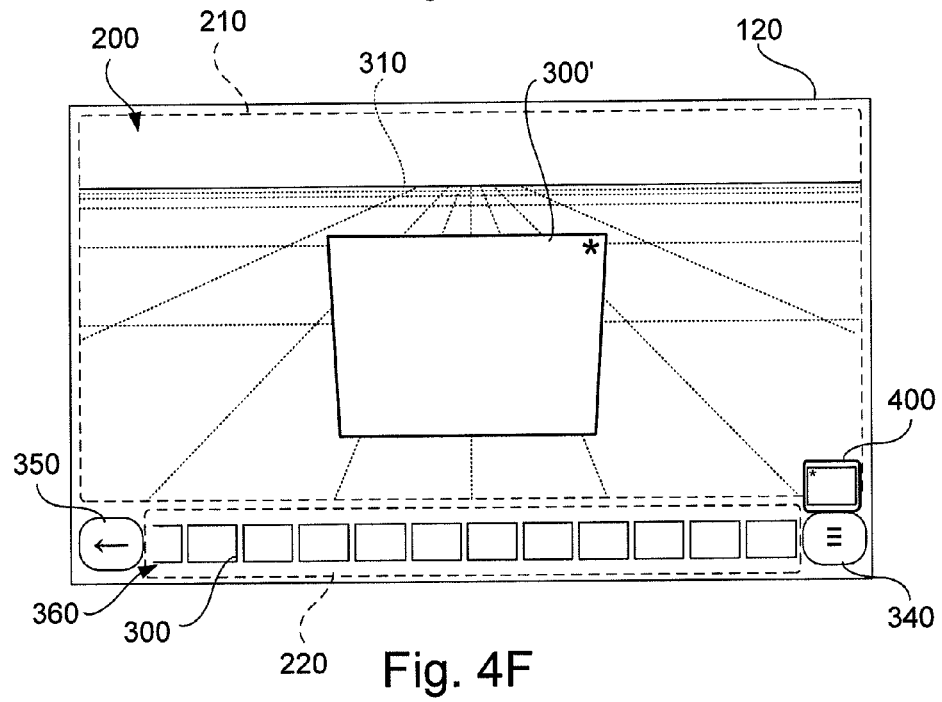
FIG. 4F is an illustration of a sixth screen shot of the user interface shown in FIG. 4A, in which the floating shortcut is fully displayed in the vicinity of the end of the second region beyond which the selected content item has been moved. The end beyond which the selected content item has been moved is the other end from the end beyond which it had been moved in FIG. 4D.

A screen which can be displayed after the selection of the floating shortcut 400 is illustrated in FIG. 4D.

Hence selecting the floating shortcut 400 can have similar effects to selecting a displayed content item 300.

A user may take one or more actions in relation to the content items 300, as described above. For example, if a content item 300 corresponds to a video (or another type of content that can be played back), then the action can involve playing back the video or stopping the playback of the video.

The one or more actions can involve changing the content item 300 from one state to another. For example, the state of a content item 300 corresponding to a video can be changed from a stopped state to a playback state or vice versa.

Figure 5A:
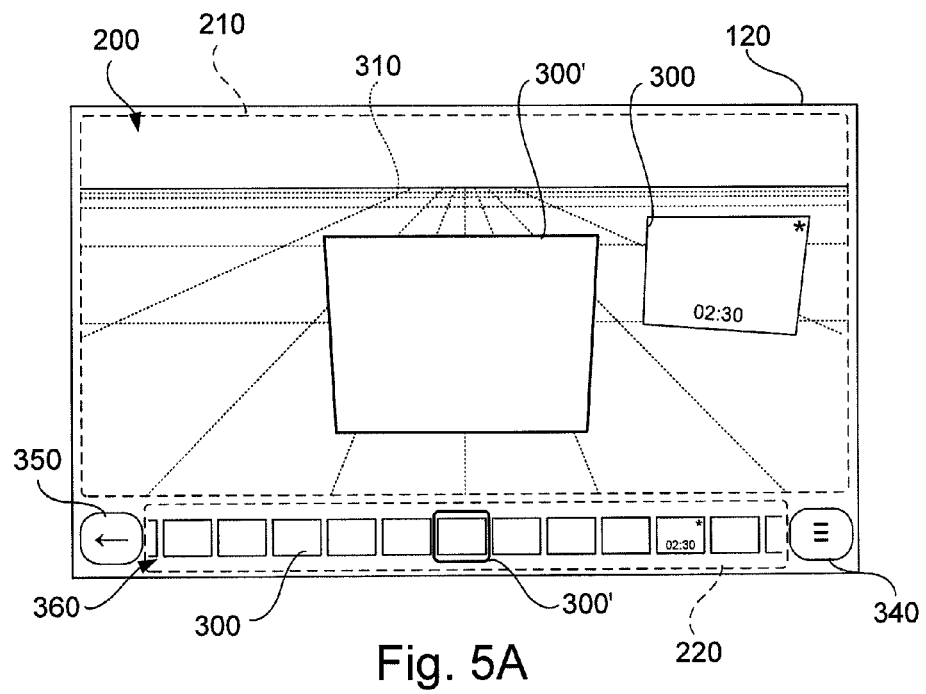
FIG. 5A is an illustration of a first screen shot of a user interface, in which content items including a content item corresponding, for example, to a video are displayed in first and/or second regions of a display.
Figure 5B:
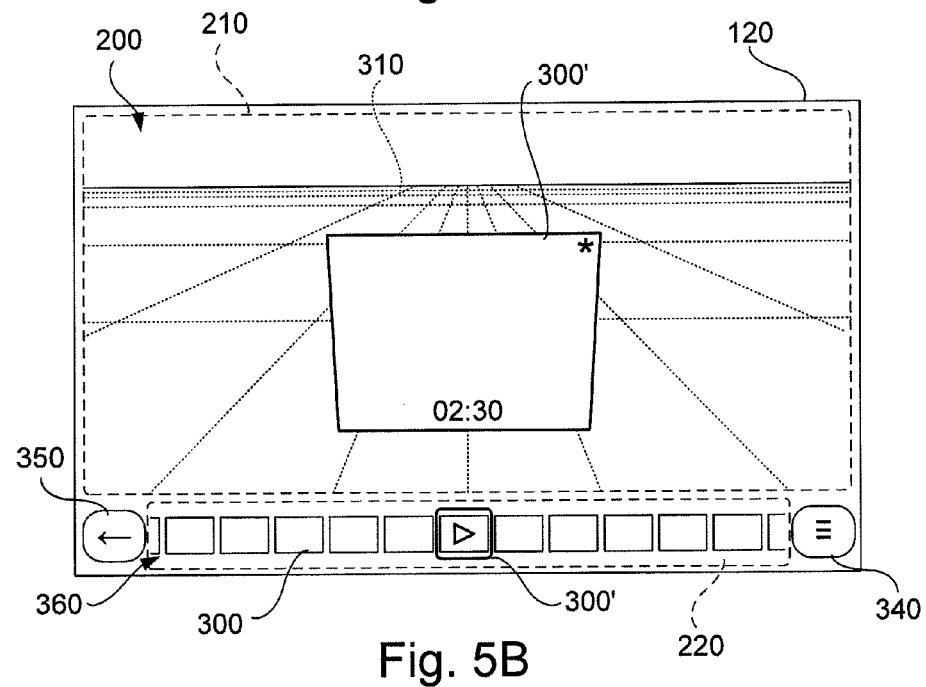
FIG. 5B is an illustration of a second screen shot of the user interface shown in FIG. 5A, in which the content item corresponding to the video has been selected. In the second region, the content item corresponding to the video has been changed to a playback button.

The appearance of a content item 300 in the first and/or second display region 210, 220 can be changed when it is selected so as to provide an indication of an action that can be taken in relation to the selected content item 300'. For example, if a content item 300 corresponds to a video, then, when the content item 300 is selected, the item 300' can be changed to a play button in the second display region 220. At the same time, the selected content item 300' can be automatically centred in each of the first and second regions 210, 220, as described above. This is illustrated in FIG. 5B.

Alternatively, if a content item 300 corresponds to content other than video, then a user may take other actions in relation thereto and the change in appearance can reflect this.

Furthermore, there could be a menu giving a choice of actions that can be taken.

The input for selecting the content item 300 can be repeated to take the action in relation to the selected content item 300'. Alternatively, a different input, e.g. a longer touch of the touch-sensitive screen 120, 160 (FIG. 1), could be used to take the action.

Figure 5C:
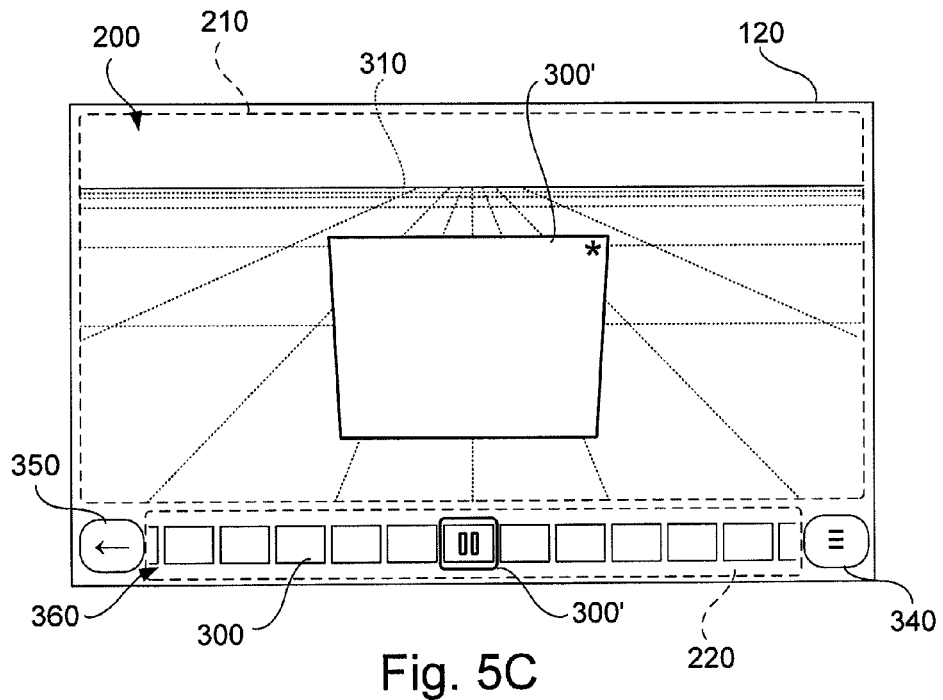
FIG. 5C is an illustration of a third screen shot of the user interface shown in FIG. 5A, in which the video is being played back in the first region. The playback may have been started by selecting the playback button shown in FIG. 5B. In the second region, the content item corresponding to the video has been changed to a pause button.

The appearance of the selected content item 300' in the first and/or second display region 210, 220 can be changed when the action is taken in relation to the selected content item 300'. The changed appearance can provide an indication of a further action that can be taken in relation to the selected content item 300'. For example, when a selected content item 300' corresponding to a video is being played back, the item 300' can be changed to a pause button in the second display region 220. Playback of the video can take place in the first display region 210. This is illustrated in FIG. 5C.

Alternatively or additionally, the appearance of the selected content item 300' in the first and/or second display region 210, 220 can be changed when there is a change in the state of the selected content item 300' that is not related to an action having been taken as described above. For example, if the selected content item 300' corresponds to a video, then, when the video has finished playing back, the item 300' can be changed to a play button in the second display region 220.

Thus, an improved way for a user to control the state of a selected content item 300', e.g. to control playback of a video, can be provided.

Figure 5D:
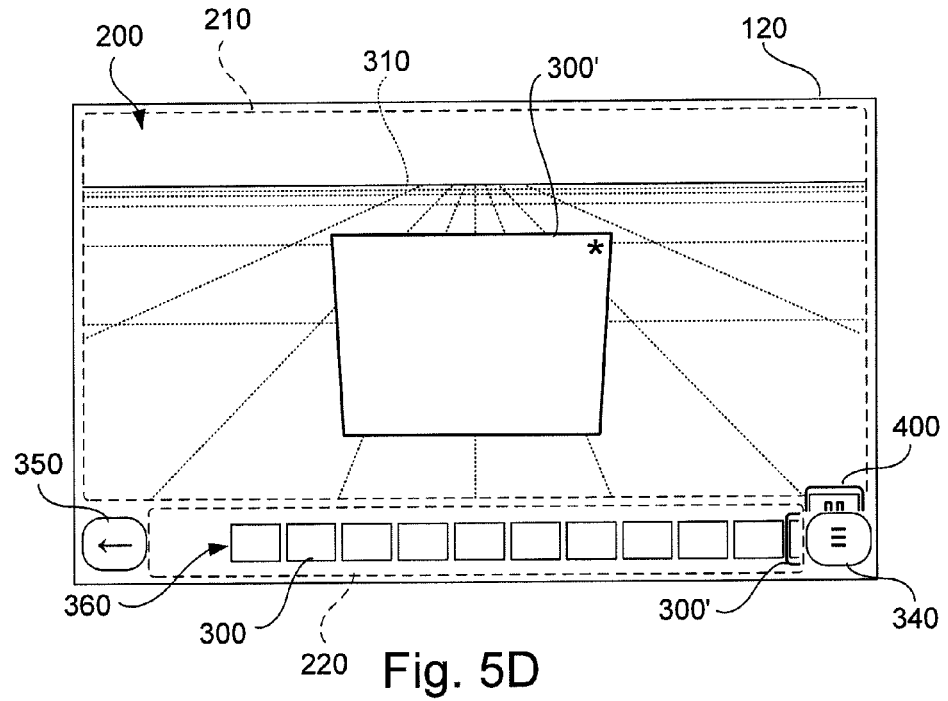
FIG. 5D is an illustration of a fourth screen shot of the user interface shown in FIG. 5A, in which the video is being played back in the first region. The second region has been used for browsing content items. A floating shortcut is partially displayed in the vicinity of the end of the second region to which the selected content item has been moved. The floating shortcut is also a pause button.
Figure 5E:
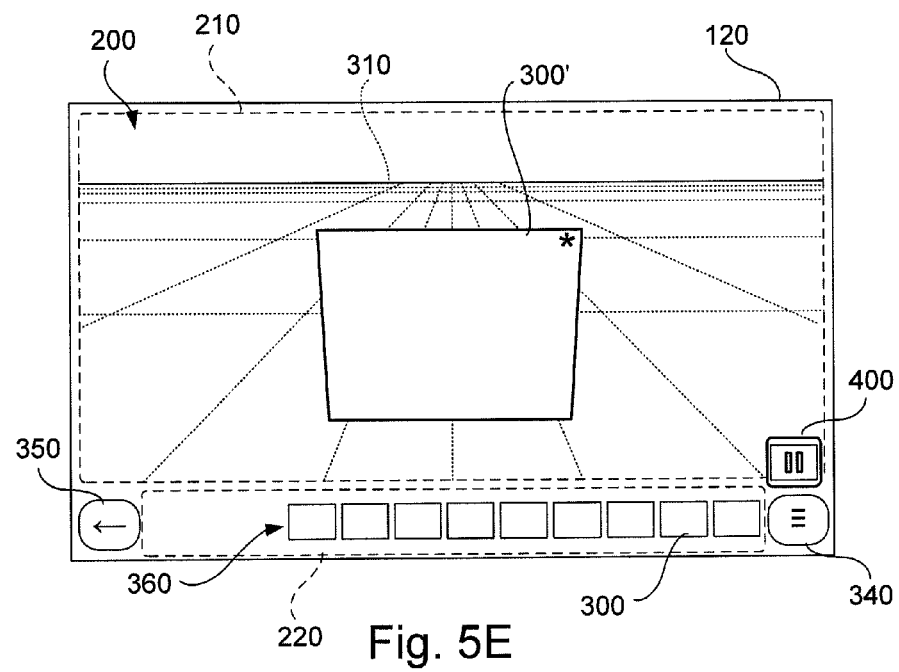
FIG. 5E is an illustration of a fifth screen shot of the user interface shown in FIG. 5A, in which the video is being played back in the first display region. The floating shortcut is fully displayed in the vicinity of the end of the second region beyond which the selected content item has been moved.
Figure 5F:
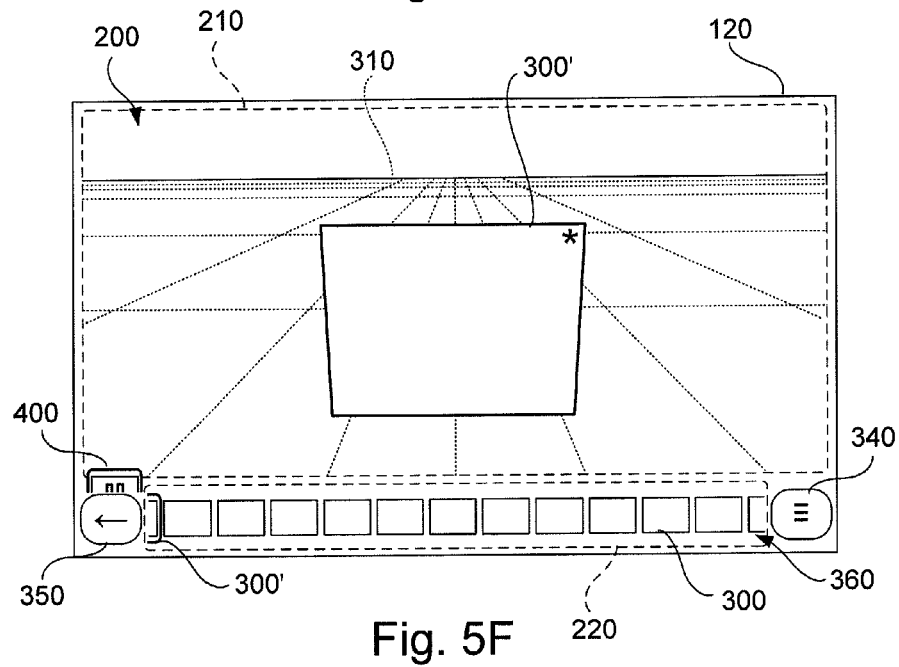
FIG. 5F is an illustration of a sixth screen shot of the user interface shown in FIG. 5A, in which the video is being played back in the first region. The second region has been used for browsing content items. A floating shortcut is partially displayed in the vicinity of the end of the second region to which the selected content item has been moved. The end to which the selected content item has been moved is the other end from the end to which it had been moved in FIG. 5D.

A user may want to use the second display region 220 to browse the content items 300 while displaying a selected content item 300' in the first display region. For example, a user may want to browse other content items 300, while a video (or another type of content) is being played back. If a user scrolls the content items 300 in the second display region 220 such that a selected content item 300' is no longer displayed therein, then a floating shortcut 400 can be displayed, as illustrated in FIGS. 5D and 5E (where the floating shortcut has been moved to the left) and in FIGS. 5F and 5G (where the floating shortcut has been moved to the right).

The floating shortcut 400 is similar to the one described above with reference to FIG. 4.

In this case, the floating shortcut 400 can also provide control functionality similar to that provided by the selected content item 300' when it was displayed in the second display region 220.

Figure 5G:
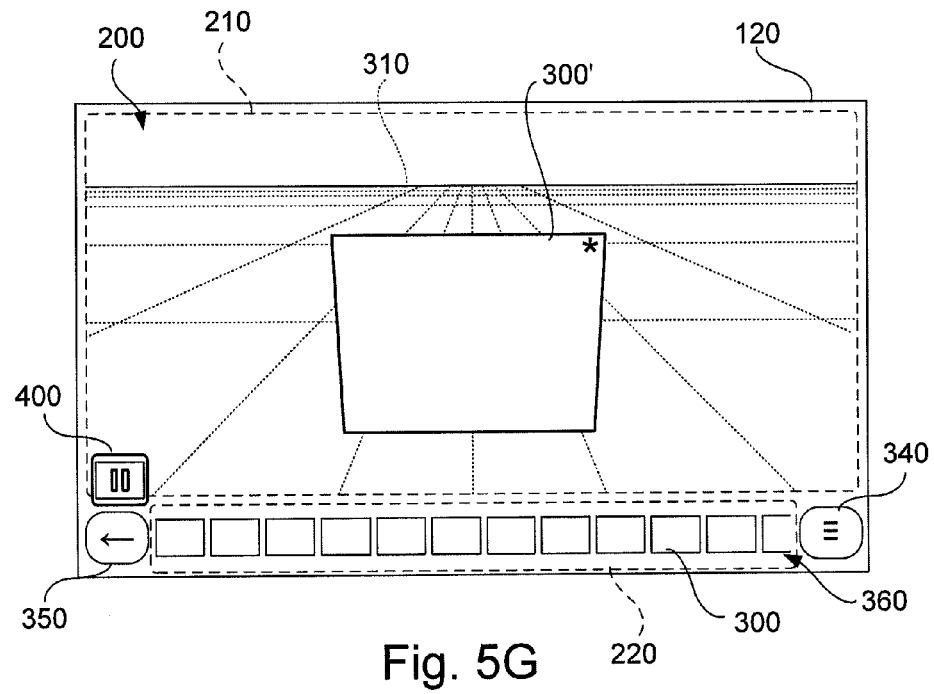
FIG. 5G is an illustration of a seventh screen shot of the user interface shown in FIG. 5A, in which the video is being played back in the first display region. The floating shortcut is fully displayed in the vicinity of the end of the second region beyond which the selected content item has been moved. The end beyond which the selected content item has been moved is the other end from the end beyond which it had been moved in FIG. 5E.

In particular, the appearance of the floating shortcut 400 can provide an indication of actions that can be taken in relation to the selected content item 300'. For example, the floating shortcut 400 can be a playback button when the video is paused and can be a pause button when it is being played back, as illustrated in FIG. 5E or 5G.

In this case, the actions can be taken by selecting the floating shortcut 400, e.g. by touching the touch-sensitive screen 120, 160 (FIG. 1) in the vicinity of the floating shortcut 400.

Alternatively or additionally, the appearance of the floating shortcut 400 can be changed when there is a change in the state of the selected content item 300' that is not related to such an action, e.g. when a video has finished playing back.

Thus, a user may still control the state of a selected content item 300', even after browsing content items 300 in the second display region 220, thereby causing the selected content item 300' not to be displayed therein.

Figure 5H:
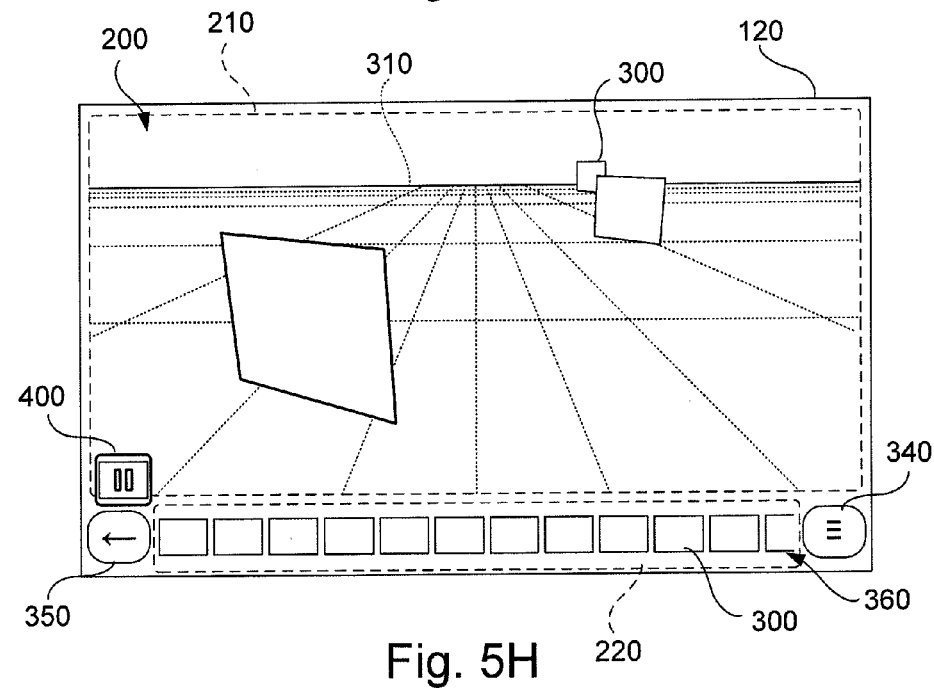
FIG. 5H is an illustration of an eighth screen shot of the user interface shown in FIG. 5A, in which the first and the second regions have been used for browsing content items. The selected content item corresponding to the video which is being played back is not displayed in the first region or the second region. The floating shortcut is displayed in the vicinity of the end of the second region beyond which the selected content item has been moved.

Furthermore, a user may browse content items using both display regions 210, 220, thereby causing the selected content item 300' not to be displayed in either of the display regions 210, 220, as illustrated in FIG. 5H. In this case, a user may still select the floating shortcut 400 to control the state of the selected content item 300' and/or to go back to viewing the currently selected content item 300', as described above. The same input or different inputs in relation to the floating shortcut 400 can be used to control the state of the selected content item 300' or to go back to viewing the currently selected content item 300'. The different inputs could include, for example, shorter or longer touches of the touch-sensitive screen 120, 160 (FIG. 1) in the vicinity of the floating shortcut 400.

Inputs in relation to the floating shortcut 400, or inputs in relation to a displayed content item 300 in the first or second display region 210, 220 can cause further actions to be taken. The further actions can be in relation to the selected content item 300' or the displayed content item 300. The further actions can include, for example, sending the content item 300 to a recipient or deleting the content item 300. The further actions can be taken for any type of content item 300, e.g. an image or a video. The inputs for causing the further action to be taken can be different from the inputs for causing the actions described above to be taken, e.g. controlling the state of the selected content item 300' or going back to viewing the selected content item 300'. For example, an input could include a relatively long touch of the touch-sensitive screen 120, 160 (FIG. 1) in the vicinity of the floating shortcut 400 or the displayed content item 300. Alternatively or additionally, an input could include a swiping action in the vicinity of the floating shortcut 400 or the displayed content item 300. Different inputs can cause different respective further actions to be taken. An input can cause a menu to be displayed giving a choice of further actions. An input for causing a further action to be taken can be the same as an input for causing one of the actions described above to be taken, e.g. controlling the state of the selected content item 300' or going back to viewing the selected content item 300'. In this case, the action and the further action can be taken simultaneously or consecutively. For example, if an input is made in relation to the floating shortcut 400, then the selected content item 300' can be displayed prominently, e.g. centrally, in the first and second display regions 210, 220 and then a menu can be displayed giving a choice of further actions.

An example method, comprising a sequence of steps corresponding to some of those described above, is shown in FIG. 6. At a first step S101, at least one of a set of content items 300 is displayed in the first display region 210. At a second step S102, at least one of the set of content items 300 is displayed in a second display region 220. At a third step S103, it is determined whether there has been an input in relation to the first display region 210. If so, then, at a fourth step S104, at least one other of the set of content items 300 is displayed in the first display region 210. At a fifth step S105, it is determining whether there has been an input in relation to the second display region 220. If so, then, at a sixth step S106, at least one other of the set of content items 300 is displayed in the second display region 220. At a seventh step S107, it is determining whether a selected one of the set of content items 300' is not being displayed in the second display region 220. If so, e.g. if the selected content item 300' is not being displayed, then, at an eighth step S108, an element 400 associated with the selected content item 300' is displayed.

The position of the element 400 can indicate a direction of an input in relation to the second display region 220 that is needed to cause the selected content item 300' to be displayed in the second display region 220. At a ninth step S109, it is determined whether there has been an input in relation to the element 400. If so, at a tenth step S110, at least one action is taken in relation to the selected content item 300'. The at least one action in relation to the selected content item 300' can comprise displaying the selected content item 300' in the first and/or the second display region 210, 220, if it is not already displayed therein. Alternatively or additionally, the at least one action can comprise causing a state of the selected content item 300' to be changed, e.g. to a playback state. At an eleventh step S111, it is determined whether there has been an input in relation to a displayed content item 300. If so, at a twelfth step S112, at least one action is taken in relation to the displayed content item 300. The at least one action can be the same as the at least one action in relation to the selected content item 300'. The at least one action in relation to the displayed content item 300 can also comprise selecting the displayed content item 300. At a thirteenth step S113, it is determined whether a state of the displayed content item 300 has been changed. This change can include the displayed content item 300 having been selected. If so, at a fourteenth step S114, the appearance of the displayed content item 300 is changed accordingly. The changed appearance can provide an indication of one of the at least one action that can be taken in relation to the displayed content item 300. At a fifteenth step S115, it is determined whether a state of the selected content item 300 has been changed. If so, at a sixteenth step S116, the appearance of the element 400 is changed accordingly. The changed appearance can provide an indication of one of the at least one action that can be taken in relation to the selected content item 300'. Thereafter, the method returns to step S103.

It will be appreciated that steps and operations described above can be performed by the controller 110, using the memory 130, under control of instructions that form part of the user interface 200 (optionally running on the operating system). During execution, some or all of the computer program(s) that constitutes the operating system, the user interface 200 and the media player, social/business networking and trading applications may be stored in the RAM. In the event that only some of this computer program(s) is stored in the RAM, the remainder can reside in the ROM.

It should be realized that the foregoing embodiments should not be construed as limiting. Other variations and modifications will be apparent to persons skilled in the art upon reading the present application.

For example, a floating shortcut could be displayed whenever a selected content item 300' is not being displayed in the first display region 210. This could be instead of or in addition to the floating shortcut 400 associated with the second display region 220 described above.

Furthermore, there could be more than one selected content item 300' and so more than one floating shortcut 400.

Furthermore, instead of there being two display regions 210, 220 there could be only one display region or more than two display regions.

Furthermore, instead of the layouts described above, the first and/or second display region 210, 220 could be for displaying the content items 300 in any other browseable layout.

Furthermore, different sets of content items 300 could be displayed in the first and second display regions 210, 220.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

What is claimed is:

1. A method comprising:
  causing at least one of a set of content items to be displayed in a first region of a display, one of the content items of the set being a selected content item;
  causing a plurality of content items of the set to be displayed in a second region of the display, the plurality of content items displayed in the second region including the selected content item;
  in response to an input in relation to the second region, causing at least one content item of the set, which was previously not displayed in the second region, to be displayed in the second region and causing at least one of the plurality of content items, including the selected content item, to be removed from display in the second region; and
  responding to a determination that the selected content item is not being displayed in the second region by causing a floating shortcut element associated with the selected content item to be displayed, the floating shortcut element being caused to to toggle back and forth between being displayed and not being displayed based on the non-display or display of a larger image representation of the selected content item elsewhere within the display, such that when the larger image representation of the selected content item appears on the display in accordance with a user's input, the floating shortcut that is associated with the selected content item is not displayed without further user input.

2. A method according to claim 1, wherein the position on the display of the displayed floating shortcut element indicates a direction of an input in relation to the second region that is needed to cause the selected content item to be displayed in the second region.

3. A method according to claim 1, comprising:
in response to a user-selection of the displayed floating shortcut element, taking at least one action in relation to the selected content item.

4. A method according to claim 3, comprising:
in response to an input in relation to a content item that is being displayed in the first and/or the second region, taking at least one action in relation to the displayed content item.

5. A method according to claim 3, wherein the at least one action in relation to the selected content item comprises causing the selected content item to be displayed in the first and/or the second region.

6. A method according to claim 3, wherein the at least one action in relation to the selected content item comprises causing a state of the selected content item to be changed.

7. A method according to claim 6, wherein the change in the state comprises a change from a playback state to a stopped state or vice versa.

8. A method according to claim 1, comprising:
in response to a change in a state of the selected or the displayed content item respectively, causing the appearance of the floating shortcut element or the displayed content item to be changed.

9. A method according to claim 1, comprising:
causing a view of a space to be displayed in the first region;
causing each of the content items displayed in the first region to be displayed at a predetermined location in the space; and
in response to an input in relation to the first region, causing the view of the space to be changed, thereby causing the at least one other content item to be displayed in the first region.

10. A method according to claim 1, comprising:
causing the content items displayed in the second region to be displayed in a one-dimensional arrangement in an order that is defined for the set of content items.

11. A non-transitory computer-readable storage medium having stored thereon computer-readable code, which, when executed by computer apparatus, causes the computer apparatus to:
display at least one of a set of content items in a first region of a display, one of the content items of the set being a selected content item;
display a plurality of content items of the set in a second region of the display, the plurality of content items displayed in the second region including the selected content item;
in response to an input in relation to the second region, display in the second region at least one content of the set, which was previously not displayed in the second region, and remove at least one of the plurality of content items including the selected content item, from display in the second region; and
in response to determining that the selected content item is not being displayed in the second region, display a floating shortcut element associated with the selected content item, the floating shortcut element being caused to toggle back and forth between being displayed and not being displayed based on the non-display or display of a larger image representation of the selected content item elsewhere within the display, such that when the larger image representation of the selected content item appears on the display in accordance with a user's input, the floating shortcut element that is associated with the selected content item is not displayed without further user input.

12. An apparatus comprising:
at least one processor; and
at least one memory including computer program code,
wherein the at least one memory and the computer program code are configured, with the at least one processor, to cause the apparatus to:
display at least one of a set of content items in a first region of a display, one of the content items of the set being a selected content item;
display a plurality of content items of the set in a second region of the display, the plurality of content items displayed in the second region including the selected content item;
in response to an input in relation to the second region, display in the second region at least one content item of the set, which was previously not displayed in the second region, and remove at least the selected content item, from display in the second region; and
in response to determining that the selected content item is not being displayed in the second region, display a floating shortcut element associated with the selected content item, the floating shortcut element being caused to toggle back and forth between being displayed and not being displayed based on the non-display or display of a larger image representation of the selected content item elsewhere within the display, such that when the larger image representation of the selected content item appears on the display in accordance with a user's input, the floating shortcut element that is associated with the selected content item is not displayed without further user input.

13. An apparatus according to claim 12, wherein the position on the display of the displayed floating shortcut element indicates a direction of an input in relation to the second region that is needed to cause the selected content item to be displayed in the second region.

14. An apparatus according to claim 12, wherein the at least one memory and the computer program code are configured, with the at least one processor, to cause the apparatus to:
in response to user-selection of the floating shortcut element, take at least one action in relation to the selected content item.

15. An apparatus according to claim 14, wherein the at least one memory and the computer program code are configured, with the at least one processor, to cause the apparatus to:
in response to an input in relation to a content item that is being displayed in the first and/or the second region, take at least one action in relation to the displayed content item.

16. An apparatus according to claim 14, wherein the at least one action in relation to the selected content item comprises causing the selected content item to be displayed in the first and/or the second region.

17. An apparatus according to claim 14, wherein the at least one action in relation to the selected content item comprises causing a state of the selected content item to be changed.

18. An apparatus according to claim 17, wherein the change in the state comprises a change from a playback state to a stopped state or vice versa.

19. An apparatus according to claim 12, wherein the at least one memory and the computer program code are configured, with the at least one processor, to cause the apparatus to:
- in response to a change in a state of the selected or the displayed content item respectively, change the appearance of the floating shortcut element or the displayed content item.

20. An apparatus according to claim 12, wherein the at least one memory and the computer program code are configured, with the at least one processor, to cause the apparatus to:
- determine a type of the content of the selected content item; and
- determine an appearance of the floating shortcut element in dependence on the type.

* * * * *